(12) United States Patent
Iizuka et al.

(10) Patent No.: US 7,809,502 B2
(45) Date of Patent: Oct. 5, 2010

(54) ONBOARD CONTENT PROVIDING APPARATUS

(75) Inventors: Tomoyuki Iizuka, Ichikawa (JP); Toshihiro Kujirai, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 928 days.

(21) Appl. No.: 11/019,184

(22) Filed: Dec. 23, 2004

(65) Prior Publication Data

US 2005/0201376 A1 Sep. 15, 2005

(30) Foreign Application Priority Data

Mar. 10, 2004 (JP) ............................. 2004-066976

(51) Int. Cl.
*G01C 21/30* (2006.01)
*G01C 21/32* (2006.01)

(52) U.S. Cl. .................. 701/210; 701/36; 701/117; 701/201; 701/202; 701/204; 701/208; 701/209; 701/211; 340/990; 340/994; 340/995.12; 340/995.13; 342/357.01; 342/357.09; 342/357.13; 455/455; 455/456.1

(58) Field of Classification Search .............. 701/210, 701/36, 117, 200, 201, 202, 204, 208, 209, 701/211; 340/990, 994, 995.12, 995.13; 342/357.1, 357.9, 357.13; 455/455, 456.1
See application file for complete search history.

(56) References Cited

U.S. PATENT DOCUMENTS

| | | | | | |
|---|---|---|---|---|---|
| 5,383,128 | A | * | 1/1995 | Nishida et al. ............... | 701/210 |
| 5,987,377 | A | * | 11/1999 | Westerlage et al. ......... | 701/204 |
| 6,594,580 | B1 | * | 7/2003 | Tada et al. ................... | 701/211 |
| 6,738,698 | B2 | * | 5/2004 | Ichihara et al. .............. | 701/36 |
| 6,847,885 | B2 | * | 1/2005 | Sato et al. ................... | 701/201 |
| 7,135,993 | B2 | * | 11/2006 | Okamoto et al. ........... | 340/995.1 |
| 7,630,831 | B2 | * | 12/2009 | Hagiwara .................... | 701/209 |
| 2001/0003825 | A1 | * | 6/2001 | Gotou et al. ................ | 709/203 |
| 2001/0008404 | A1 | * | 7/2001 | Naito et al. ................. | 345/745 |
| 2001/0047229 | A1 | * | 11/2001 | Staggs ......................... | 701/3 |
| 2002/0138180 | A1 | * | 9/2002 | Hessing et al. .............. | 701/1 |
| 2002/0169551 | A1 | * | 11/2002 | Inoue et al. ................. | 701/213 |
| 2002/0188390 | A1 | * | 12/2002 | Ichihara et al. .............. | 701/36 |

(Continued)

FOREIGN PATENT DOCUMENTS

JP 2000-346667 12/2000

(Continued)

*Primary Examiner*—Khoi Tran
*Assistant Examiner*—Jorge O Peche
(74) *Attorney, Agent, or Firm*—Mattingly & Malur, P.C.

(57) ABSTRACT

In an information providing service that utilizes a car navigation system or the like, ensuring safety while viewing content is a matter of great concern. A vehicle-mounted onboard content providing apparatus for providing content to a user of the vehicle, comprising a current location acquisition unit for acquiring information about the current location, an instruction input unit whereby information about the destination and instructions for selecting the content to be delivered are inputted, a control unit for editing the content retrieved based on the instructions, and an output unit for outputting the edited content, wherein the control unit determines, on the basis of attribute information assigned to the route included in the results of retrieving the route from the current location to the destination, sections in which content is outputted or not outputted on the route, and edits the content on the basis of the result of this determination.

12 Claims, 14 Drawing Sheets

| NUMBER | PASS POINT | | REQUIRED TIME | TYPE | | | OUTPUT DISTRIBUTION | |
|---|---|---|---|---|---|---|---|---|
| | LATITUDE | LONGITUDE | | | | | | |
| 351 | 352 | | 353 | 357 | | | 358 | |
| 21 | LA21 | L021 | T11+...+T50 | NEWS | POLITICS | POLITICS 1 ... | 80% | 20% |
| | | | | | ECONOMICS | ECONOMICS 1 ... | | 50% |
| | | | | | SOCIETY | SOCIETY 1 ... | | 20% |
| 53 | LA53 | L053 | T53+...+T100 | | | | | 10% |
| | | | | SPORTS | DOMESTIC | DOMESTIC 1 ... | 20% | 50% |
| | | | | | OVERSEAS | OVERSEAS 1 ... | | 50% |

U.S. PATENT DOCUMENTS

| | | | |
|---|---|---|---|
| 2003/0158655 A1* | 8/2003 | Obradovich et al. | 701/207 |
| 2004/0150534 A1* | 8/2004 | Linn | 340/995.13 |
| 2005/0138662 A1* | 6/2005 | Seto | 725/75 |
| 2006/0155461 A1* | 7/2006 | Cho | 701/207 |
| 2006/0156209 A1* | 7/2006 | Matsuura et al. | 714/798 |
| 2010/0117810 A1* | 5/2010 | Hagiwara et al. | 340/425.5 |

FOREIGN PATENT DOCUMENTS

| | | |
|---|---|---|
| JP | 2002-269144 | 9/2002 |
| JP | 2002-365061 | 12/2002 |
| JP | 2003-187383 | 7/2003 |

\* cited by examiner

*FIG. 3*

| TYPE | | TIME | UPDATED DATE | |
|---|---|---|---|---|
| | | | | 134 |
| NEWS | POLITICS | POLITICS 1 | a11 | a21 | ... |
| | | ... | ... | ... | |
| | ECONOMICS | ECONOMICS 1 | b11 | b21 | ... |
| | | ... | ... | ... | |
| | SOCIETY | SOCIETY 1 | c11 | c21 | ... |
| | | ... | ... | ... | |
| SPORTS | DOMESTIC | DOMESTIC 1 | e11 | e21 | ... |
| | | ... | ... | ... | |
| | OVERSEAS | OVERSEAS 1 | f11 | f21 | ... |
| | | ... | ... | ... | |
| WEATHER FORECAST | OVERALL CONDITIONS | OVERALL CONDITIONS | g1 | G2 | |
| | NATIONAL | | h1 | h2 | |
| | REGIONAL | REGIONAL 1 | i11 | i21 | ... |
| | | ... | | | |
| ... | | | | | |

| NUMBER | PASS POINT | | REQUIRED TIME | ATTRIBUTE INFORMATION | |
|---|---|---|---|---|---|
| | LATITUDE | LONGITUDE | | | |
| 1 | LA1 | LO1 | T1 | P1 | SAFE SECTION |
| 2 | LA2 | LO2 | T2 | P2 | SECTION WITH RIGHT AND LEFT CURVES |
| 3 | LA3 | LO3 | T3 | P2 | SECTION WITH RIGHT AND LEFT CURVES |
| ... | ... | ... | ... | ... | ... |
| 11 | LA11 | LO11 | T11 | P1 | SAFE SECTION |
| ... | ... | ... | ... | ... | ... |
| 21 | LA21 | LO21 | T21 | P1 | SAFE SECTION |
| ... | ... | ... | ... | ... | ... |
| 50 | LA50 | LO50 | T50 | P1 | SAFE SECTION |
| 51 | LA51 | LO51 | T51 | P3 | HIGH-ACCIDENT SECTION |
| 52 | LA52 | LO52 | T52 | P3 | HIGH-ACCIDENT SECTION |
| 53 | LA53 | LO53 | T53 | P1 | SAFE SECTION |
| ... | ... | ... | ... | ... | ... |
| 100 | LA100 | LO100 | T100 | P1 | SAFE SECTION |
| 101 | LA101 | LO101 | T101 | P4 | HIGH-CAUTION SECTION |
| ... | ... | ... | ... | ... | ... |
| 151 | LA151 | LO151 | T151 | P4 | HIGH-CAUTION SECTION |
| 152 | LA152 | LO152 | T152 | P1 | SAFE SECTION |
| ... | ... | ... | ... | ... | ... |

| TYPE | | TIME | UPDATED DATE | ... |
|---|---|---|---|---|
| NEWS | POLITICS | POLITICS 1 | a11 | a21 | ... |
| | | ... | ... | ... | ... |
| | ECONOMICS | ECONOMICS 1 | b11 | b21 | ... |
| | SOCIETY | SOCIETY 1 | c11 | c21 | ... |
| | | ... | ... | ... | ... |
| SPORTS | DOMESTIC | DOMESTIC 1 | e11 | e21 | ... |
| | OVERSEAS | OVERSEAS 1 | f11 | f21 | ... |
| | | ... | ... | ... | ... |

| NUMBER (351) | PASS POINT (352) | | REQUIRED TIME (353) | ATTRIBUTE INFORMATION (354) | | (355) |
|---|---|---|---|---|---|---|
| | LATITUDE | LONGITUDE | | | | |
| 11 | LA11 | LO11 | T11 | P1 | SAFE SECTION | ... |
| ... | ... | ... | ... | ... | | ... |
| 21 | LA21 | LO21 | T21 | P1 | SAFE SECTION | ... |
| ... | ... | ... | ... | ... | | ... |
| 50 | LA50 | LO50 | T50 | P1 | SAFE SECTION | ... |
| 51 | LA51 | LO51 | T51 | P3 | HIGH-ACCIDENT SECTION | ... |
| 52 | LA52 | LO52 | T52 | P3 | HIGH-ACCIDENT SECTION | ... |
| 53 | LA53 | LO53 | T53 | P1 | SAFE SECTION | ... |
| ... | ... | ... | ... | ... | | ... |
| 100 | LA100 | LO100 | T100 | P1 | SAFE SECTION | ... |
| 101 | LA101 | LO101 | T101 | P4 | HIGH-CAUTION SECTION | ... |
| ... | ... | ... | ... | ... | | ... |
| 151 | LA151 | LO151 | T151 | P4 | HIGH-CAUTION SECTION | ... |
| 152 | LA152 | LO152 | T152 | P1 | SAFE SECTION | ... |
| ... | ... | ... | ... | ... | | ... |

| | PASS POINT | | | |
|---|---|---|---|---|
| NUMBER (351) | LATITUDE | LONGITUDE (352) | REQUIRED TIME (353) | CONTENT AVAILABILITY (356) |
| 11 | LA11 | LO11 | T11 | POSSIBLE |
| ⋮ | ⋮ | ⋮ | ⋮ | ⋮ |
| 21 | LA21 | LO21 | T21 | POSSIBLE |
| ⋮ | ⋮ | ⋮ | ⋮ | ⋮ |
| 50 | LA50 | LO50 | T50 | POSSIBLE |
| 51 | LA51 | LO51 | T51 | IMPOSSIBLE |
| 52 | LA52 | LO52 | T52 | IMPOSSIBLE |
| 53 | LA53 | LO53 | T53 | POSSIBLE |
| ⋮ | ⋮ | ⋮ | ⋮ | ⋮ |
| 100 | LA100 | LO100 | T100 | POSSIBLE |
| 101 | LA101 | LO101 | T101 | IMPOSSIBLE |
| ⋮ | ⋮ | ⋮ | ⋮ | ⋮ |
| 151 | LA150 | LO150 | T150 | IMPOSSIBLE |
| 152 | LA151 | LO151 | T151 | POSSIBLE |
| ⋮ | ⋮ | ⋮ | ⋮ | ⋮ |

FIG. 9

| NUMBER | PASS POINT | | REQUIRED TIME | TYPE | | OUTPUT DISTRIBUTION |
| --- | --- | --- | --- | --- | --- | --- |
| | LATITUDE | LONGITUDE | | | | |
| 351 | 352 | | 353 | 357 | | 358 |
| 21 | LA21 | LO21 | T11+...+T50 | NEWS | POLITICS | 80% |
| | | | | | POLITICS 1 | 20% |
| | | | | | ... | |
| | | | | ECONOMICS | ECONOMICS 1 | 50% |
| | | | | | ... | |
| | | | | SOCIETY | SOCIETY 1 | 20% |
| | | | | | ... | |
| 53 | LA53 | LO53 | T53+...+T100 | SPORTS | DOMESTIC | 20% |
| | | | | | DOMESTIC 1 | 10% |
| | | | | | ... | |
| | | | | OVERSEAS | OVERSEAS 1 | 50% |
| | | | | | ... | 50% |

FIG. 10

| NUMBER | PASS POINT | | TYPE | | | OUTPUT SPECIFICS | |
|---|---|---|---|---|---|---|---|
| | LATITUDE | LONGITUDE | | | | | |
| 21 | LA21 | L021 | NEWS | POLITICS | POLITICS 1 | "THE PRIME MINISTER..." | ... |
| ... | LA... | LO... | | | ... | "THE PRIME MINISTER..." | ... |
| ... | LA... | LO... | | ECONOMICS | ECONOMICS 1 | "THE ECONOMY..." | ... |
| ... | LA... | LO... | | | ... | "THE ECONOMY..." | ... |
| ... | LA... | LO... | | SOCIETY | SOCIETY 1 | "THE SUSPECT..." | ... |
| 53 | LA53 | L053 | SPORTS | | ... | "THE SUSPECT..." | ... |
| ... | LA... | LO... | | DOMESTIC | DOMESTIC 1 | "THE PLAYER..." | ... |
| ... | LA... | LO... | | OVERSEAS | OVERSEAS 1 | "THE PLAYER..." | ... |
| ... | LA... | LO... | | | ... | "THE PLAYER..." | ... |

FIG. 11

ONBOARD CONTENT PROVIDING APPARATUS

CLAIM OF PRIORITY

The present application claims priority from Japanese application JP2004-066976 filed on Mar. 10, 2004, the content of which is hereby incorporated by reference into this application.

BACKGROUND

This invention relates to an onboard content providing method, and particularly relates to an onboard content providing method for performing editing in accordance with changes in the required time, and an onboard content providing method for performing editing in accordance with the attributes of individual sections en route.

Recently, information providing service that uses car navigation systems has been receiving much attention. This service provides news, weather information, traffic information, tourist information, and the like delivered from a center via the car navigation system. However, if the driver reaches his or her destination before all the information that must be delivered has been provided, then either the information provision is terminated before it is completed, or the driver must wait until the provision is completed. Therefore, a method has been proposed wherein content is edited and provided according to the arrival time to the destination and other attributes.

JP 2002-269141 A discloses such a content editing and providing method.

SUMMARY

Aside from relatively safe sections, the route to the destination may have sections with frequent accidents, sections that necessitate close attention due to continuous curves and the like, and other such sections with various attributes. However, since conventional content providing methods provide content regardless of the attributes of the section, these methods do not give sufficient consideration to ensuring driving safety. Ensuring safety while the driver is paying attention to the content has been a significant problem for information providing services that utilize car navigation systems.

Also, if the conventional content providing method has already edited the content, the content is not revised even if the arrival time changes due to congested traffic or the like. Therefore, problems arise in that if the arrival time is earlier than expected, the provision of content has not completed by arrival, and if the arrival time is later than expected, a space of time occurs during which no content is provided.

This invention was designed in view of such problems, and an object thereof is to provide an onboard content providing apparatus that ensures driving safety according to constantly varying road traffic characteristics.

A vehicle-mounted onboard content providing apparatus for providing content to an user of the vehicle in accordance with the first embodiment of this invention has a current location acquisition unit for acquiring information about the current location, an instruction input unit whereby information about the destination and instructions for selecting the content to be delivered are inputted, a control unit for editing the content retrieved based on the instructions, and an output unit for outputting the edited content; wherein the control unit determines, based on attribute information assigned to the route included in the results of retrieving the route from the current location to the destination, sections in which content is outputted or not outputted on the route, and edits the content on the basis of the results of this determination.

A vehicle-mounted onboard content providing apparatus for providing content to an user of the vehicle in accordance with the second embodiment of this invention has a current location acquisition unit for acquiring information about the current location, an instruction input unit whereby information about the destination and instructions for selecting the content to be delivered are inputted, a control unit for editing the content retrieved based on the instructions, and an output unit for outputting the edited content; wherein the control unit calculates the time required to reach the destination or a passage point from the current location and compares this calculated required time with the required time previously calculated, and if a change in the required time equal to or greater than a preset value is detected as the comparison result, the control unit revises the content so that the output time of the portion of the content that has not yet been outputted roughly coincides with the calculated required time.

According to this invention, driving safety can be ensured because content is not provided in sections requiring particular attention while driving en route to the destination. Also, content provision that corresponds with constantly changing road traffic characteristics is made possible, giving the driver a more convenient and pleasant experience, because changes in the time required to reach the destination are detected, and revised content is provided so that the transmission is completed by the time the destination is reached.

BRIEF DESCRIPTION OF THE DRAWINGS

FIG. 3 is a diagram showing an example of a content list.

FIG. 6 is a diagram showing an example of the route retrieval results.

FIG. 7 is a diagram showing an example of a content list for a case in which a request is received to deliver news and sports as a type of content.

FIG. 8 is a diagram showing an example wherein the route retrieval results have been updated for a period of time from the present onward.

FIG. 9 is a diagram showing an example for a section in which content cannot be provided.

FIG. 10 is a diagram showing an example of an editing list.

FIG. 11 is a diagram showing an example of a an edited content list.

DETAILED DESCRIPTION OF THE PREFERRED EMBODIMENTS

The preferred embodiments for working this invention will now be described with reference to the diagrams.

Embodiment 1

Figure 1:
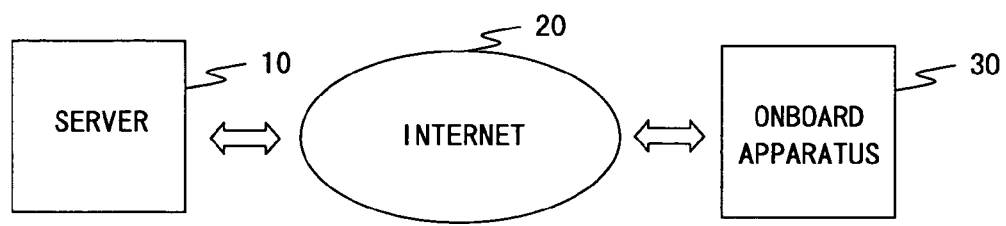
FIG. 1 is a block diagram showing the configuration of the onboard content providing system of the first embodiment of this invention.

FIG. 1 is a block diagram showing the configuration of the onboard content providing system of the first embodiment of this invention.

The onboard content providing system of this embodiment is composed of a server 10, the Internet 20, and an onboard apparatus 30.

The server 10 receives information needed for route retrieval and a content delivery request from the onboard apparatus 30. The server 10 sends the route retrieval results, a content list, and the content to the onboard apparatus 30.

The onboard apparatus 30 sends the information needed for route retrieval and the content delivery request to the server 10, and the onboard apparatus 30 estimates the content providing time, edits the content, and outputs the edited content that matches the vehicle location in accordance with the route retrieval results and content list received from the server 10. Furthermore, The onboard apparatus 30 revises the portion of the content that has not yet been inputted when a change equal to or greater than a specific value in the route retrieval results occurs.

Communication between the server 10 and the onboard apparatus 30 takes place via the Internet 20.

Figure 2:
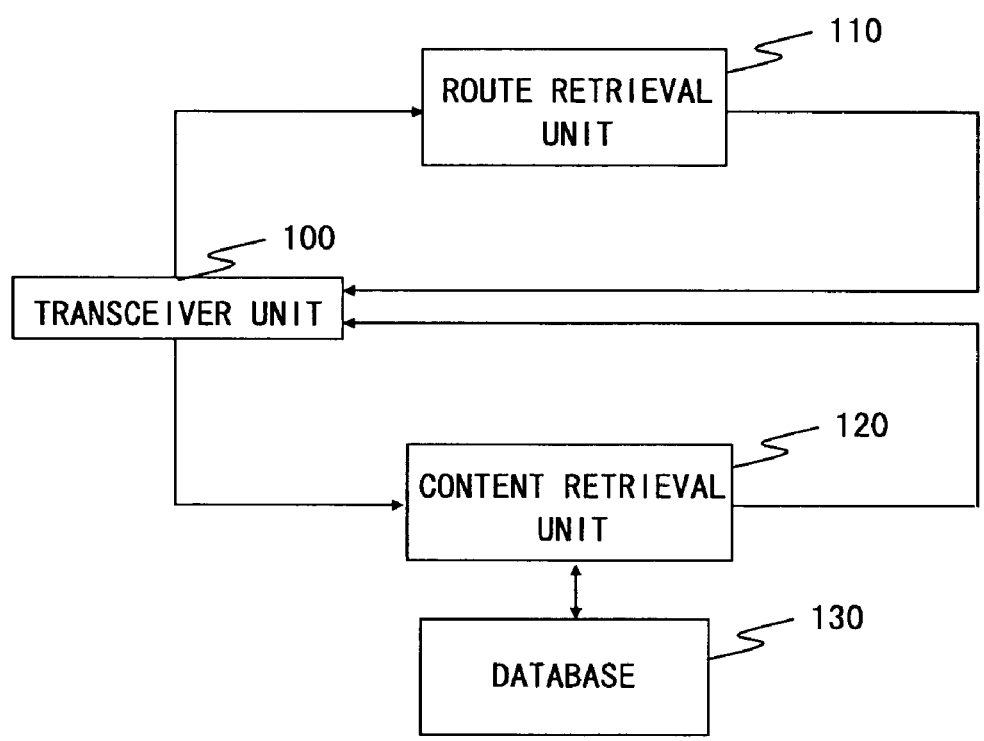
FIG. 2 is a block diagram showing the configuration of the server of the first embodiment of this invention.

FIG. 2 is a block diagram showing the configuration of the server 10 of this embodiment. The server 10 is composed of a transceiver unit 100, a route retrieval unit 110, a content retrieval unit 120, and a database 130.

The transceiver unit 100 receives a signal from the onboard apparatus 30, converts the signal to a baseband signal, modulates the data from the server 10, and sends the result to the onboard apparatus 30.

The route retrieval unit 110 conducts route retrieval on the basis of the current location, destination, traffic information, and the like.

The content retrieval unit 120 retrieves the content that matches the specifics of the content delivery request from the database 130, and creates a content list that matches the specifics of the content delivery request.

The database 130 stores the contents and content lists.

FIG. 3 is a diagram showing an example of a content list. The content list is a list of content information needed when editing the time 132 required for output, the update date and time 133, and other such information for each content type 131.

Figure 4:
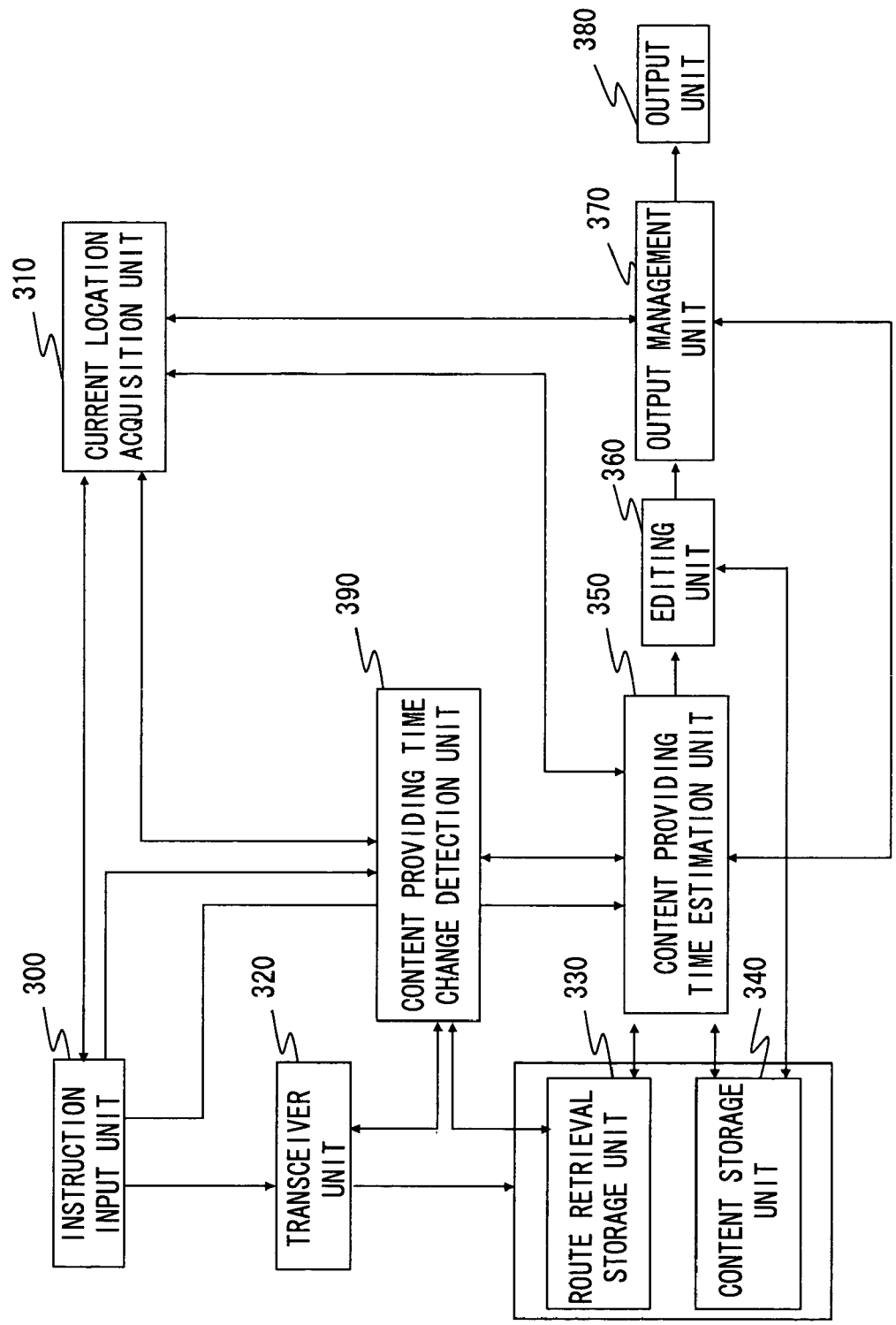
FIG. 4 is a block diagram showing the configuration of the onboard apparatus of the first embodiment of this invention.

FIG. 4 is a block diagram showing the configuration of the onboard apparatus 30 of this embodiment. The onboard apparatus 30 is composed of an instruction input unit 300, a current location acquisition unit 310, a transceiver unit 320, a route retrieval storage unit 330, a content storage unit 340, a content providing time estimation unit 350, an editing unit 360, an output management unit 370, an output unit 380, and a content providing time change detection unit 390.

When the user inputs the destination and other types of information needed for route retrieval, the content type and other specifics of content delivery request, and various instructions, the instruction input unit 300 transmits these inputs to the units in the onboard apparatus 30.

The current location acquisition unit 310 consists of a GPS receiver, for example, and provides information about the current location of the vehicle (longitude, latitude) upon receiving an acquisition request for the current location.

The transceiver unit 320 receives a signal from the server 10, converts the signal to a baseband signal, modulates data from the onboard apparatus 30, and sends the data to the server 10.

The route retrieval storage unit 330 stores the route retrieval results received from the server 10. When an acquisition request for the route retrieval results is received, the route retrieval storage unit 330 provides the latest stored route retrieval results.

The content storage unit 340 stores the content list and content received from the server 10. When an acquisition request for the content list and content is received, the content storage unit 340 provides the content list and content that corresponds to the specifics of the acquisition request.

The content providing time estimation unit 350 estimates the content providing time on the basis of the route retrieval results and the like. This unit also creates an editing list on the basis of the content providing time, the content list, the output progress, and the like.

The editing unit 360 edits the content on the basis of the editing list and the content list, and creates edited content.

The output management unit 370 sends the edited content that corresponds to the current location of the vehicle to the output unit 380. Furthermore, the output management unit 370 provides information about the output progress of the content to the content providing time estimation unit 350, and sends a content list acquisition request corresponding to the output progress to the content storage unit 340.

The output unit 380 outputs the edited content sent from the output management unit 370.

The content providing time change detection unit 390 acquires the current location of the vehicle at preset intervals from the current location acquisition unit 310, and detects changes in the required time. When the required time has changed by a preset value or greater, the content providing time change detection unit 390 sends an acquisition request for acquiring the route retrieval results to the content providing time estimation unit 350.

Figure 5:
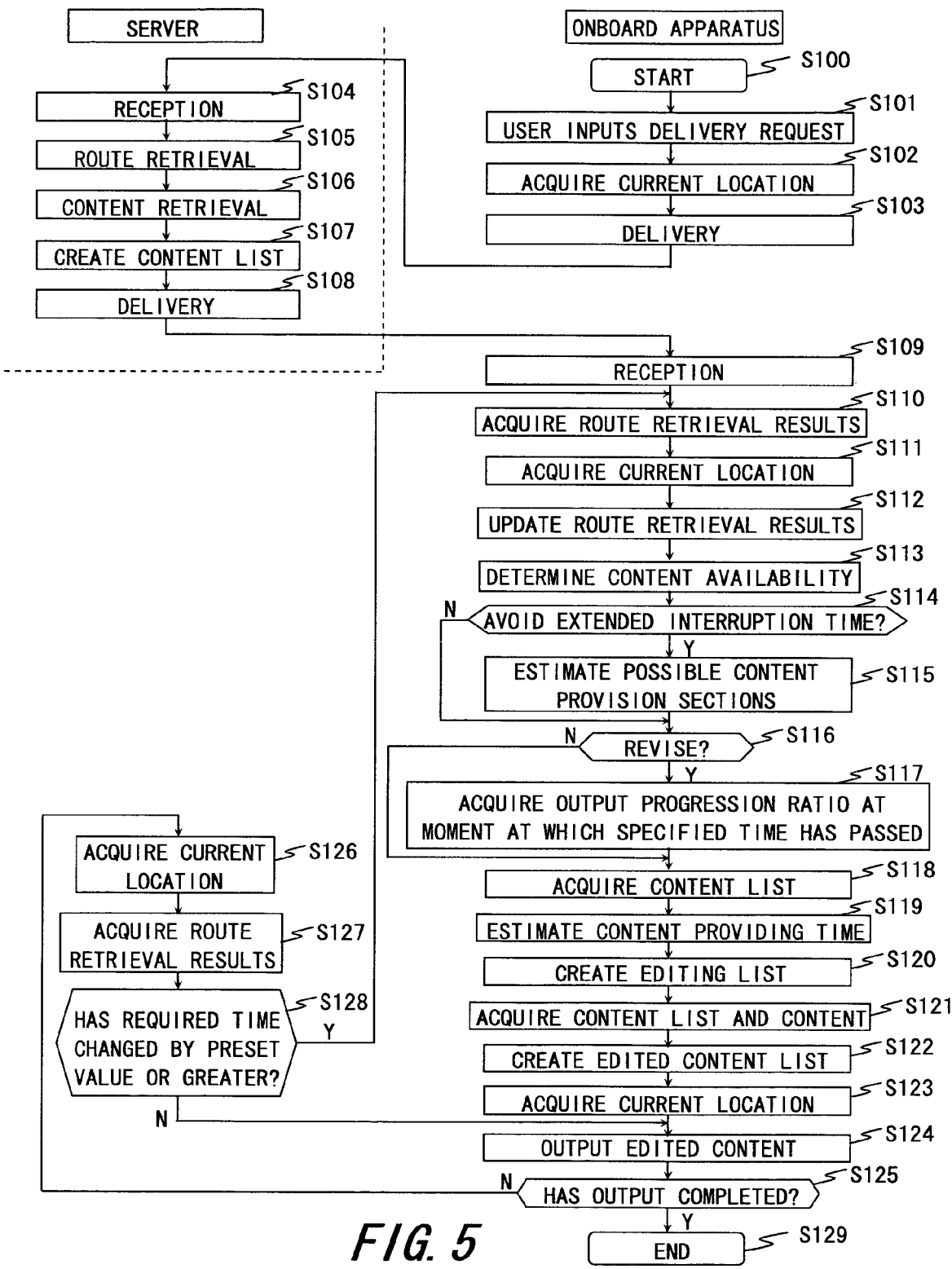
FIG. 5 is a flowchart showing the process of the onboard content providing system of the first embodiment of this invention.

FIG. 5 is a flowchart showing the process of the onboard content providing system of this embodiment.

When the instruction input unit 300 of the onboard apparatus 30 initiates an operation to receive instructions (S100), the user inputs the destination and other types of information needed for route retrieval, the content type and other content delivery request specifics, and various instructions from the instruction input unit 300 (S101). The various instructions include instructions pertaining to the editing method, instructions pertaining to output distribution needed when a plurality of types of content is specified, and the like. The term "output distribution" used herein refers to specifying the ratio of output times for the multiple content types. The user can arbitrarily set the output distribution according to the user's preferences and the like. For example, when the user requests news and sports service, the user can set the output time for news at sixty percent and the output time for sports at forty percent of the total output time.

When the destination and other types of information needed for route retrieval are inputted, the instruction input unit 300 sends an acquisition request for the current location of the vehicle to the current location acquisition unit 310, and acquires the information (S102).

When the destination and other types information needed for route retrieval, and the content type and other content delivery request are inputted, the instruction input unit 300 at least sends an acquisition request for acquiring the route retrieval results to the content providing time estimation unit 350 and sends the name of the destination to the content providing time change detection unit 390. The content providing time change detection unit 390 receives the name of the destination and stores the name of the destination in a storage area (not shown).

The instruction input unit 300 sends the current location, destination, and other information needed for route retrieval, and the content type and other content delivery request specifics to the transceiver unit 320. The transceiver unit 320 modulates the data for this information and sends the result to the server 10 (S103).

The transceiver unit 100 of the server 10 receives the current location, destination, and other information needed for route retrieval, as well as the content type and other content delivery request specifics via the Internet 20 (S104). The route retrieval unit 110 conducts route retrieval on the basis of the information needed for route retrieval received from the onboard apparatus 30, and forecasted traffic information (S105).

FIG. 6 is a diagram showing an example of route retrieval results. The route retrieval results include location information 112 for pass points, required time 113 between pass points, attribute information 114 between pass points, and a management number 111 for specifying the pass points.

Attribute information 114 is assigned to each section between the pass points (individual section), and includes information that draws the attention of the driver for sections with right and left curves, sections where accidents have occurred in the past, sections that require concentration such as mountain roads, and the like.

In the content retrieval unit 120, content that matches the content type and other content delivery request specifics received from the onboard apparatus 30 is retrieved from the database 130 (S106). Also in the content retrieval unit 120, a content list that matches the content type and other content delivery request specifics received from the onboard apparatus 30 is created from the content list stored in the database 130 (S107).

FIG. 7 is a diagram showing an example of a content list for a case in which a request is received to deliver news and sports as a type of content. The content list created herein includes the content type 136, the time 137 required for output for each content type, and the update date and time 138.

The route retrieval unit 110 sends the route retrieval results to the transceiver unit 100. The content retrieval unit 120 sends the retrieved content and the created content list to the transceiver unit 100. The transceiver unit 100 sends at least the route retrieval results, the content list, and the content to the onboard apparatus 30 via the Internet 20 (S108).

The transceiver unit 320 of the onboard apparatus 30 receives the route retrieval results, the content list, and the content from the server 10, and converts them to a baseband signal. The transceiver unit 320 stores the route retrieval results in the route retrieval storage unit 330, and stores the content list and content in the content storage unit 340 (S109).

In this embodiment, the server 10 has the route retrieval unit 110, but the route retrieval unit 110 may also be included in the onboard apparatus 30. In this case, the onboard apparatus 30 does not sent the information needed for route retrieval to the server 10, but the route is retrieved by the route retrieval unit 110 in the onboard apparatus 30, and the results are stored in the route retrieval storage unit 330.

The content providing time estimation unit 350 receives an acquisition request for the route retrieval results from the instruction input unit 300 or the content providing time change detection unit 390, sends the acquisition request for the route retrieval results to the route retrieval storage unit 330, and acquires the results (S110). The content providing time estimation unit 350 sends an acquisition request for the current location to the current location acquisition unit 310 and acquires the current location (S111), whereupon the route retrieval results are updated to the route retrieval results from the current location forward on the basis of the current location (S12).

FIG. 8 is a diagram showing an example wherein the route retrieval results shown in FIG. 6 have been updated for a period of time from the present onward. In this example, the current location was latitude LA11 and longitude LO11, so the sections from 1 to 10 already passed are removed from the numbers 351.

The content providing time estimation unit 350 determines, based on attribute information 354 assigned to an individual section in the route retrieval results from the current location forward, whether content for the individual section can be provided (S113). For example, the unit may determine that content is not provided for the following sections (sections where content is unavailable): sections with right and left curves, sections where accidents have occurred, sections where caution is needed to avoid running off narrow roads and the like, sections requiring much concentration with mountain roads and the like, sections with continuous curves, construction sections, sections with bus stops, school zones, and the like. As a result of no content provision in these sections, the driver focuses more on driving and driving safety can be ensured.

FIG. 9 is a diagram showing an example for a section in which content cannot be provided. In this example, content provision availability 356 is determined to be "impossible" for high-accident sections and low maneuverability sections from the route retrieval results shown in FIG. 8. Therefore, these sections are sections where content is unavailable.

Also, when a section where content is unavailable continues, the time in which content cannot be provided extends for a long period of time, and the provided content is divided into content provided before and after the extended interruption time, there is a danger that, for example, there will be an extended interruption between two strongly correlated news broadcasts, and the user may not fully understand the content. Therefore, when an upper limit is set on the allowable interruption time, and the time in which content cannot be provided exceeds this upper limit, an extended interruption time in which no content is provided may be avoided by providing the content only before and after the interruption. The user can thus choose whether or not to avoid an interruption (S114).

This upper limit may differ between situations wherein the interruption due to sections where content is unavailable occurs between sections where the same type of content is provided, and situations wherein the interruption occurs between sections where different types of content are provided. This is because situations wherein the interruption occurs between sections where different types of content are provided are generally believed to be unlikely to hinder the user's understanding of the content even with an extended interruption time, as opposed to when an interruption occurs between sections where the same type of content is provided. For example, when the provided content is news and sports, the upper limit of the interruption time between the time news is completed and the time sports begins may be made greater than the upper limit of an interruption in the middle of news or sports.

To avoid an interruption time, the content providing time estimation unit 350 estimates a possible content provision section on the basis of the required time 353 of the sections where content is unavailable. Specifically, a required time obtained by adding the required time 353 of a continuous section where content is unavailable is compared with a preset upper limit, and when the required time exceeds the upper limit, either the section before the section of unavailable content or the section after the section of unavailable content is estimated to be the possible content provision section.

For example, in FIG. 9, if the required time of a section of unavailable content with a number 351 of 101 to 150 exceeds the upper limit, and the required time of the preceding and following sections of available content (time during which content can be provided) are compared, a section with a number 351 less than 101 is estimated to be the possible content provision section when the time of available content with a number 351 less than 101 is determined to be long (S115). As a result, an extended interruption of content provision can be avoided, and the user can easily understand the details of the content.

When the content has not yet been edited (S116), the content providing time estimation unit 350 receives an acquisition request for the content list in the content storage unit 340 from the output management unit 370. The content providing time estimation unit 350 calculates the content output distribution, sends an acquisition request for the content list to the content storage unit 340, and acquires the content list (S118).

The content providing time estimation unit 350 estimates the time needed to initiate output and estimates the content providing time on the basis of the content list, the content output distribution, and information about whether or not content can be provided, and on the basis of information about possible content provision sections (S119).

However, when the content has already been edited and is going to be revised as described below (S116), the output progress of the unrevised content outputted during the time until the revised content output is initiated must be inspected. Therefore, the content providing time estimation unit 350 sends an acquisition request to the output management unit 370 for the output progress for the moment at which the time needed to initiate the estimated output as previously described has passed, and acquires the content output progress ratio for the moment at which this time (specific time) has passed (S117). At the same time, an acquisition request is received for acquiring a content list corresponding to the output progress for the moment at which the specific time has passed for the content storage unit 340. The content providing time estimation unit 350 calculates the content output distribution according to the acquired output progression ratio, sends a content list acquisition request corresponding to the output progression at the moment at which the specific time has passed, and acquires the content list (S118). For example, if the initial output distribution is sixty percent news and forty percent sports, and the output progression at the moment at which the specific time has passed is determined so that one third of the sixty percent news is completed, then the subsequent output distribution is fifty percent news and fifty percent sports.

The content providing time estimation unit 350 estimates the time needed to initiate output and estimates the content providing time on the basis of the content list corresponding to the output progression at the moment at which the specific time has passed, the content output distribution, and information about whether the content can be provided, or on the basis of information about possible content provision sections (S119).

In FIG. 9, for example, when the time at which the management number 351 is 11 to 20 is required to initiate output, the time at which the management number 351 is less than 20 is removed from possible content providing times.

The content providing time estimation unit 350 creates, on the basis of the content list, the content output distribution, and information about the content providing time, an editing list according to the attribute information assigned to the individual sections of the route, (S120).

FIG. 10 shows an example of the created editing list. The editing list includes a management number 351 for managing sections for editing, location information 352 about sections for editing, required time 353 for sections for editing, content type 357 to be edited, and an output distribution 358 for each content type.

The created editing list is inputted to the editing unit 360.

When the editing list is inputted, the editing unit 360 sends a content list acquisition request and a content acquisition request to the content storage unit 340 according to the content type shown in the editing list, and acquires the content and content list (S121). The editing unit 360 edits the acquired content according to the acquired content list and the editing list, and creates the edited content and the edited content list corresponding to the attribute information assigned to the individual sections of the route (S122).

The method disclosed in JP 2002-269141 A, for example, can be used as the editing method. However, the character scroll speed during screen output or the playback speed during audio output or the like may be altered to perform editing so as to vary the content providing time.

The content acquired from the content storage unit 340 has a preset upper limit and lower limit for the post-editing output time, and is edited so that the post-editing output time remains within these limits.

For example, when the content is news, a summary including the minimum amount of information needed to comprehend an outline of the news is set as the lower limit, the details including all detailed information is set as the upper limit, and the content is edited so that the output time remains within the upper and lower limits. Therefore, the content can be edited in a range wherein the content can be understood.

The editing unit 360 sends the created edited content list to the output management unit 370.

FIG. 11 is a diagram of an example of an edited content list. The edited content list includes a management number 361 for managing sections for outputting, location information 362 for sections for outputting, content type 363 for outputting, output specifics 364, and other types of settings (playback speed and the like) 365 for outputting. The details of the items in the output specifics 364 constitute the edited content.

The output management unit 370 receives the edited content list created by the editing unit 360 and stores it in a storage area (not shown). The output management unit 370 receives events produced at preset intervals by a timer (not shown) installed in the onboard apparatus 30, acquires the current location of the vehicle from the current location acquisition unit 310 at preset intervals (S123), and sends the edited content that corresponds to the location to the output unit 380.

The output unit 380 outputs the edited content that corresponds to the current location sent from the output management unit 370 (S124).

If the output of the edited content is not completed (S125), the content providing time change detection unit 390 receives events produced at preset intervals from the timer (not shown) installed in the onboard apparatus 30, sends an acquisition request for the current location of the vehicle to the current location acquisition unit 310, and acquires the current location (S126). Then the content providing time change detection unit 390 sends the information needed for route retrieval, including the acquired current location and the destination sent from the instruction input unit 300, to the transceiver unit 320, sends an acquisition request for the route retrieval results to the route retrieval storage unit 330, and acquires the results (S127).

The content providing time change detection unit 390 compares the latest acquired route retrieval results with the route retrieval results stored in the storage area and detects whether the required time for each section has changed by a preset value or greater (S128), whereupon the content providing time change detection unit 390 stores the latest route retrieval results in the storage area for storing route retrieval results instead of the route retrieval results heretofore stored in the storage area, sends an acquisition request for acquiring the route retrieval results to the content providing time estimation unit 350 (S110), and initiates content revision (S111 to S122).

The editing unit 360 or the like then revises the content so that the time required to reach the destination or a passage point from the current location roughly coincides with the output time for the content to be outputted. Also, when a section of unavailable content occurs in the sections from the current location to the destination or passage point, the content is revised so that the time obtained by subtracting the required time for the section of unavailable content from the time required to reach the destination or passage point from the current location roughly coincides with the output time for the content to be outputted thereafter.

When the required time for each section has not changed by a preset value or greater (S128), the output of the edited content continues unchanged (S124).

The content providing time change detection unit 390 may also calculate the required time on the basis of the latest road conditions and other such information, and detect changes in the required time from those results. For example, the transceiver unit 320 has a function for receiving road traffic information provided from external sources, and sends the received information to the content, providing time change detection unit 390. The content providing time change detection unit 390 calculates the required time on the basis of the information, compares the results with the route retrieval results stored in the storage area, and if any changes greater than or equal to a preset value are detected, content revision is initiated (S218). The road traffic information provided from external sources may be provided from the server 10, for example, or may be VICS information received via FM or from a beacon or information provided by ATIS.

The content providing time change detection unit 390 may calculate the required time on the basis of speed information of the vehicle sent from a speed detection unit (not shown), and may detect changes in the required time from the results. For example, the average speed is determined from the movement speed of the vehicle detected by the speed detection unit, and the required time is calculated from the average speed. The results are compared with the route retrieval results stored in the storage area, and if any changes of a preset value or greater are detected, content revision is initiated (S128).

Thus, it is possible to provide content that corresponds to changes in the road conditions by detecting changes in the required time and performing revisions accordingly. For example, when the arrival time at the destination will be later than expected due to traffic congestion, content can be continuously provided until the destination is reached by performing revisions so as to increase the amount of provided content in a range that does not exceed a preset upper limit. Also, when traffic congestion clears and the arrival time will be earlier than expected, the total provision of content can be completed by the time the destination is reached by performing editing so as to decrease the amount of provided content in a range that does not fall below a preset lower limit.

When the output of the edited content is completed, the content provision process is completed as well (S129).

Embodiment 2

The second embodiment of this invention will now be described with reference to the diagrams. The second embodiment differs from the previously described first embodiment in that content is not edited by the onboard apparatus 30, but instead is edited by the server 10. In the second embodiment, detailed descriptions are omitted for the same configurations as in the previously described first embodiment.

The onboard content providing system of this embodiment is composed of a server 10, the Internet 20, and an onboard apparatus 30, similar to the first embodiment (FIG. 1).

The server 10 receives a content delivery request and information needed for route retrieval from the onboard apparatus 30, and sends an edited content list to the onboard apparatus 30.

The onboard apparatus 30 sends the information needed for route retrieval and the content delivery request to the server 10, and outputs the edited content received from the server 10 according to the location of the vehicle.

Communication between the server 10 and the onboard apparatus 30 takes place via the Internet 20.

Figure 12:
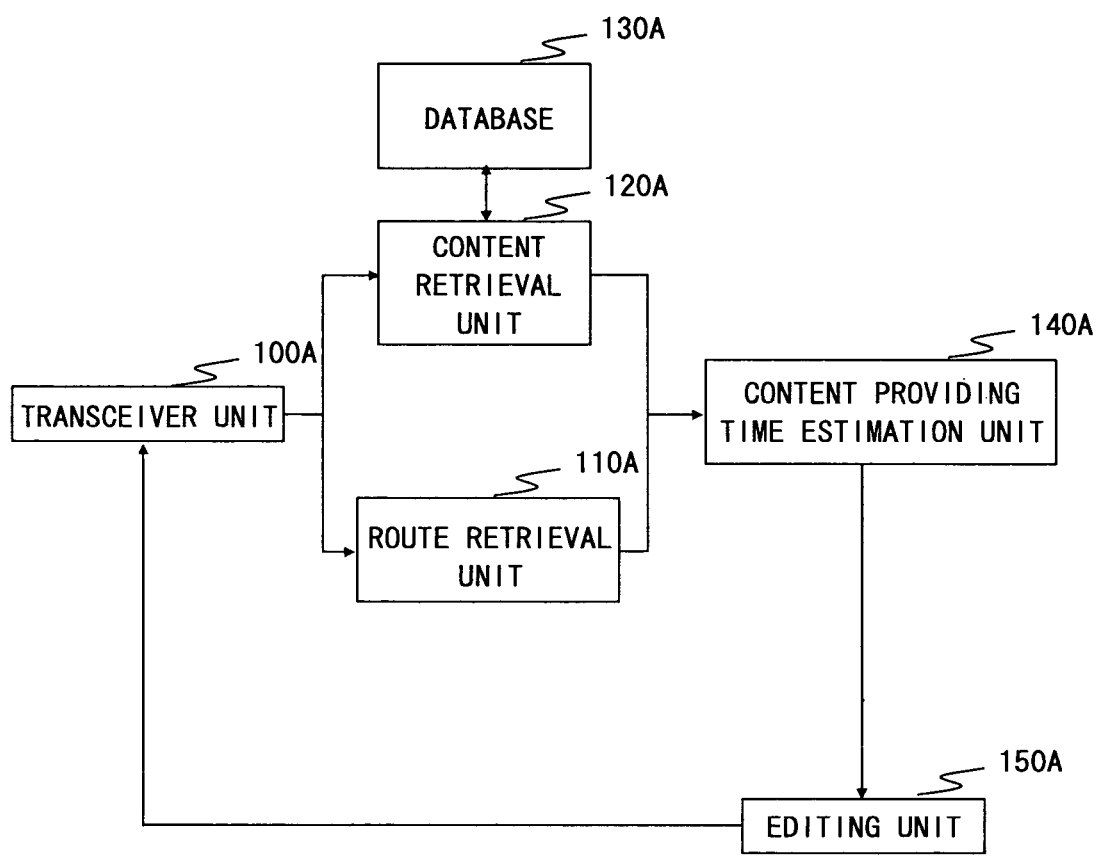
FIG. 12 is a block diagram showing the configuration of the server of the second embodiment of this invention.

FIG. 12 is a block diagram showing the configuration of the server 10 of this embodiment. The server 10 is composed of a transceiver unit 100A, a route retrieval unit 110A, a content retrieval unit 120A, a database 130A, a content providing time estimation unit 140A, and an editing unit 150A.

The transceiver unit 100A receives a signal from the onboard apparatus 30, converts the signal to a baseband signal, modulates the data from the server 10, and sends the result to the onboard apparatus 30.

The route retrieval unit 110A conducts route retrieval on the basis of the current location, destination, traffic information, and the like.

The content retrieval unit 120A retrieves the content that matches the specifics of the content delivery request from the database 130A, and creates a content list that matches the specifics of the content delivery request.

The database 130A stores the contents and content lists. The stored content list is the same as in the first embodiment (FIG. 3).

The content providing time estimation unit 140A estimates the content providing time on the basis of the route retrieval results and the like. This unit also creates an editing list on the basis of the content providing time, the content list, the output progress, and the like.

The editing unit 150A edits the content on the basis of the editing list and the content list, and creates edited content.

Figure 13:
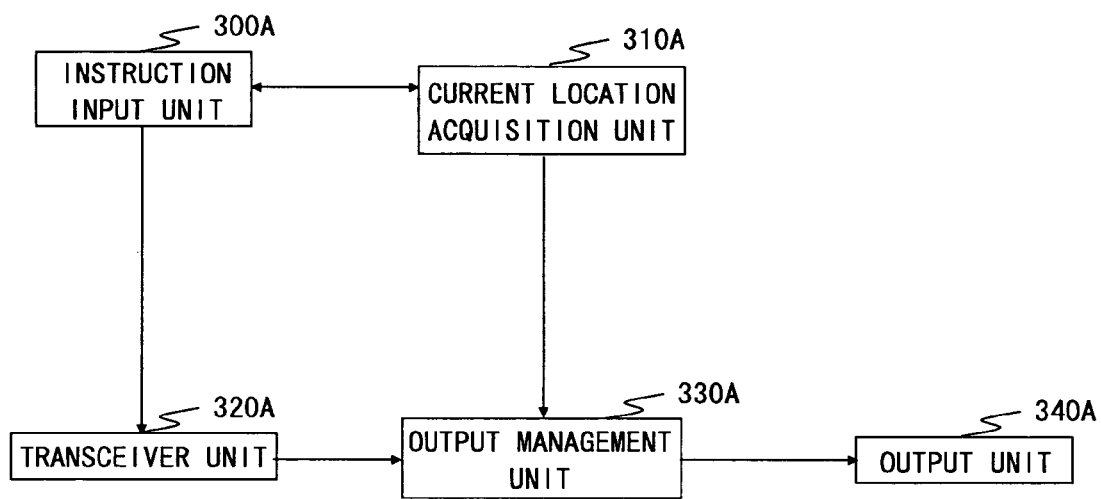
FIG. 13 is a block diagram showing the configuration of the onboard apparatus of the second embodiment of this invention.

FIG. 13 is a block diagram showing the configuration of the onboard apparatus 30 of this embodiment. The onboard apparatus 30 is composed of an instruction input unit 300A, a current location acquisition unit 310A, a transceiver unit 320A, an output management unit 330A, and an output unit 340A.

When the user inputs the destination and other types of information needed for route retrieval, the content type and other specifics needed for content delivery, and various instructions, the instruction input unit 300A acquires the current location from the current location acquisition unit 310A and transmits these inputs to the transceiver unit 320A.

The current location acquisition unit 310A provides the information for the current location of the vehicle upon receiving an acquisition request for the current location.

The transceiver unit 320A receives a signal from the server 10, converts the signal to a baseband signal, modulates data from the onboard apparatus 30, and sends the data to the server 10.

The output management unit 330A sends the edited content that corresponds to the current location of the vehicle to the output unit 340A.

The output unit 340A outputs the edited content sent from the output management unit 330A.

Figure 14:
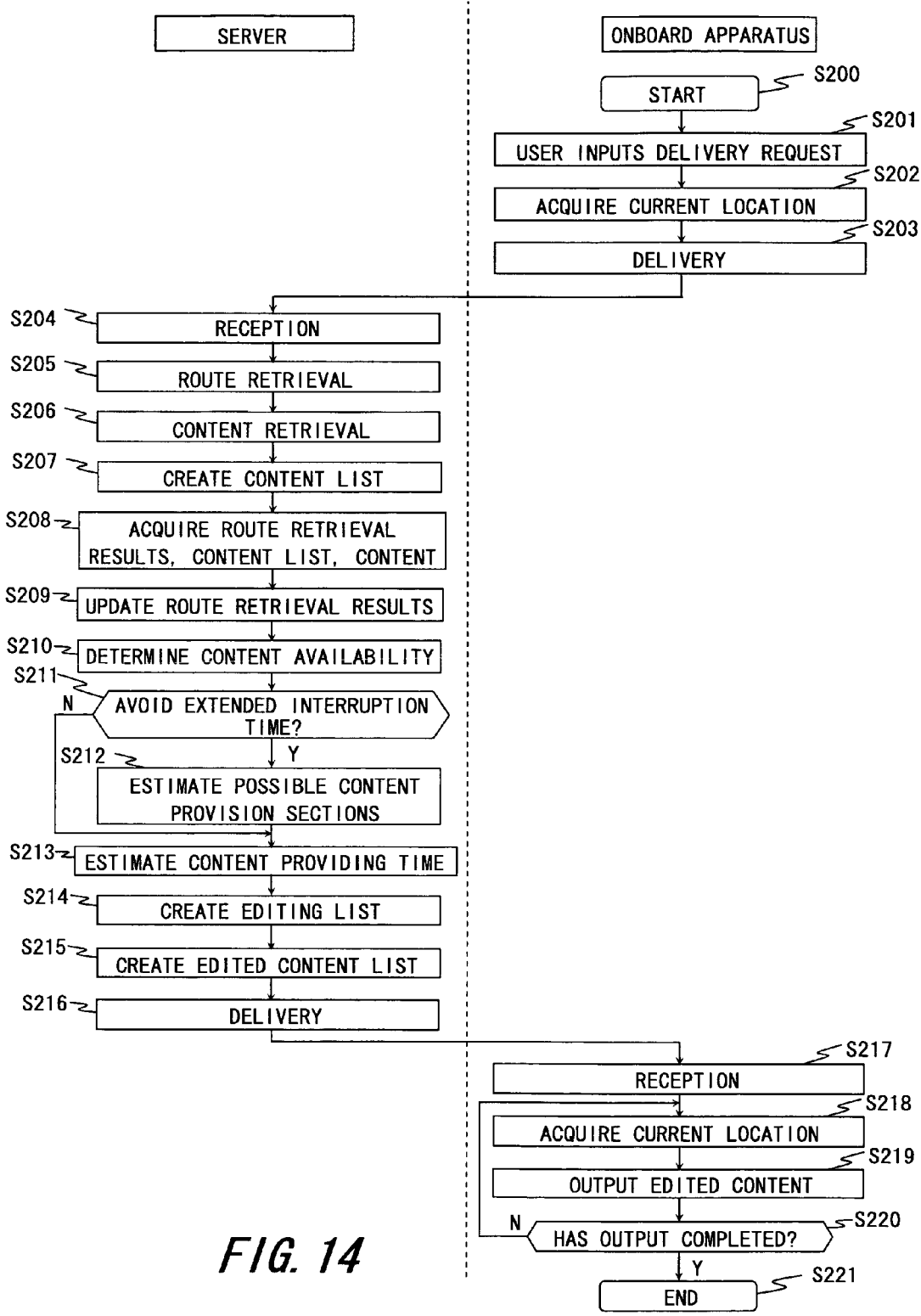
FIG. 14 is a flowchart showing the process of the onboard content providing system of the second embodiment of this invention.

FIG. 14 is a flowchart showing the process of the onboard content providing system of this embodiment.

When the instruction input unit 300A of the onboard apparatus 30 initiates an operation to receive instructions (S200), the user inputs the destination and other types of information needed for route retrieval, the content type and other content delivery request specifics, and various instructions from the instruction input unit 300A (S201). These instructions include instructions pertaining to the editing method, instructions pertaining to the output distribution needed when a plurality of types of content is specified, and the like.

When the destination and other types of information needed for route retrieval are inputted, the instruction input unit 300A sends an acquisition request for the current location of the vehicle to the current location acquisition unit 310A, and acquires the information (S202).

The instruction input unit 300A sends the current location, destination, and other information needed for route retrieval, and the content type and other content delivery request specifics to the transceiver unit 320A. The transceiver unit 320A modulates the data for the current location, destination, and other information needed for route retrieval, as well as the content type and other content delivery request specifics, and sends the result to the server 10 (S203).

The transceiver unit 100A of the server 10 receives the current location, destination, and other information needed for route retrieval, as well as the content type and other content delivery request specifics via the Internet 20 (S204). The route retrieval unit 110A conducts route retrieval on the basis of the information needed for route retrieval received from the onboard apparatus 30 and on the basis of forecasted traffic information (S205). The route retrieval results are the same as in the first embodiment (FIG. 6).

In the content retrieval unit 120A, content that matches the content type and other content delivery request specifics received from the onboard apparatus 30 is retrieved from the database 130A (S206). Also in the content retrieval unit 120A, a content list that matches the content type and other content delivery request specifics received from the onboard apparatus 30 is created from the content list stored in the database 130A (S207). The created content list is the same as in the first embodiment (FIG. 7).

The route retrieval unit 110A sends the created route retrieval results to the content providing time estimation unit 140A. The content retrieval unit 120A sends the retrieved content and the created content list to the content providing time estimation unit 140A (S208).

The content providing time estimation unit 140A updates, based on the time needed for route retrieval, including the time needed to receive information needed for route retrieval, as calculated by a timekeeping unit (not shown), the route retrieval results sent from the route retrieval unit 110A to the route retrieval results after the time needed for route retrieval has passed (S209). The updated route retrieval results are the same as in the first embodiment (FIG. 8).

The content providing time estimation unit 140A determines, based on attribute information assigned to an individual section en route, whether content for the individual section can be provided (S210). This is determined in the same manner as in the first embodiment (FIG. 9).

Also, the content providing time estimation unit 140A may estimate possible content provision sections in order to avoid extended interruptions in content provision, similar to the first embodiment (S211, S212).

The content providing time estimation unit 140A estimates the time needed to initiate output and estimates the content providing time on the basis of the content list, the content output distribution, and information about whether or not content can be provided, or on the basis of information about possible content provision sections (S213). The content output distribution may be preset, or may be inputted using the instruction input unit 300A of the onboard apparatus 30.

The content providing time estimation unit 140A creates an editing list according to the attribute information assigned to the individual sections of the route, on the basis of the content list, the content output distribution, and information about the content providing time (S214). The specifics of the editing list are the same as in the first embodiment (FIG. 10).

The created editing list is inputted to the editing unit 150A.

When the editing list is inputted, the editing unit 150A edits the content according to the content list and the editing list, and creates an edited content list corresponding to the attribute information assigned to the individual sections of the route (S215). The editing method is the same as in the first embodiment. The created edited content is also the same as in the first embodiment (FIG. 11).

The editing unit 150A sends the created edited content list to the transceiver unit 100A. The transceiver unit 100A then sends the edited content list to the onboard apparatus 30 via the Internet 20 (S216).

The transceiver unit 320A of the onboard apparatus 30 receives the edited content list from the server 10, and converts the list to a baseband signal (S217). The output management unit 330A stores the received edited content list in a storage area (not shown). The output management unit 330A receives events produced at preset intervals by a timer (not shown) installed in the onboard apparatus 30, acquires the current location of the vehicle from the current location acquisition unit 310A at preset intervals (S218), and sends the edited content that corresponds to the location to the output unit 340A.

The output unit 340A outputs the edited content that corresponds to the current location sent from the output management unit 330A (S219).

If the output of the edited content list is not completed (S220), the output continues (S218, S219), and when the output of the edited content list is completed (S220), the content provision process is completed as well (S221).

This invention can be applied to an information providing service that utilizes a car navigation system, for example, and is particularly effective for providing a service that adapts to variations in the arrival time to the destination while ensuring driving safety.

What is claimed is:

1. A vehicle-mounted onboard information providing apparatus for providing information to a user of the vehicle, comprising:

a current location acquisition unit for acquiring a current location;

an instruction input unit inputting a destination and inputting instructions for selecting categories of the information to be delivered as types of content to be provided as selected type of content for each of plural sections of a route retrieved between a current location and a destination;

a control unit for editing the selected type of content retrieved based on the instructions to provide edited content; and an output unit for outputting the edited content;

wherein the control unit:

determines for each said section of the route, based on attribute information assigned to each said section of the route included in results of retrieving the route from the current location to the destination, whether selected content is outputted or not outputted and provides a determination of whether the selected content is outputted or not outputted for each said section;

creates, based on results of the determination, an editing list including a required time for passing through each said section in which the selected content is outputted;

edits the selected content to be outputted as edited content in each said section so that a time difference between a required time for each said section in which the selected content is outputted and an output time of the selected content to be outputted is equal to or smaller than a predetermined time value; and creates an edited content list for each said section in which said selected content is outputted based on the edited content.

2. The onboard content providing apparatus according to claim 1, further comprising a transceiver unit that sends instructions for selecting the type of content to be delivered to an external server, and receives the selected content sent by the server according to the instructions;

wherein the control unit edits the selected content received by the transceiver unit.

3. The onboard content providing apparatus according to claim 2, wherein the control unit edits the selected content so as not to be outputted in said sections where information indicating that a driver of the vehicle should pay particular attention is assigned as the attribute information.

4. The onboard content providing apparatus according to claim 2, wherein the control unit edits the selected content within a range of preset upper and lower limits for an output time of the selected content.

5. The onboard content providing apparatus according to claim 2, wherein the control unit compares the required time for passing through one said section where content is not outputted with a content output time, and edits the selected content on the basis of the results of the comparison.

6. The onboard content providing apparatus according to claim 1, wherein the control unit edits the selected content so as not to be outputted in sections where information indicating that a driver of the vehicle should pay particular attention is assigned as the attribute information.

7. The onboard content providing apparatus according to claim 6, wherein the control unit edits the selected content within a range of preset upper and lower limits for an output time of the selected content.

8. The onboard content providing apparatus according to claim 6, wherein the control unit compares the required time for passing through the sections where the selected content is not outputted with a content output time, and edits the content on the basis of the results of the comparison.

9. The onboard content providing apparatus according to claim 1, wherein the control unit edits the selected content within the range of preset upper and lower limits for an output time of the content.

10. The onboard content providing apparatus according to claim 1, wherein the control unit compares the required time for passing through the sections where the selected content is not outputted with a content output time, and edits the content on the basis of the results of the comparison.

11. The onboard content providing apparatus according to claim 10, wherein the control unit compares the required time for each said section where the selected content is not outputted with a content output time when a plurality of the types of content are selected.

12. The onboard content providing apparatus according to claim 10, wherein the control unit edits the selected content on the basis of at least one of an upper limit of the time required for passing through each said section without a type of content output that lies between said sections where the selected content is outputted, and an upper limit of the time required for passing through each said section without a type of content output that lies between said sections where different types of content are outputted.

* * * * *